US012458563B2

(12) United States Patent
Bain

(10) Patent No.: US 12,458,563 B2
(45) Date of Patent: Nov. 4, 2025

(54) DILATATION DEVICES INCORPORATING ENHANCED FEATURES

(71) Applicant: Growth Armor, LLC, Wilmington, DE (US)

(72) Inventor: Michael A. Bain, Costa Mesa, CA (US)

(73) Assignee: Growth Armor, LLC, Wilmington, DE (US)

( * ) Notice: Subject to any disclaimer, the term of this patent is extended or adjusted under 35 U.S.C. 154(b) by 800 days.

(21) Appl. No.: 17/809,357

(22) Filed: Jun. 28, 2022

(65) Prior Publication Data

US 2023/0414448 A1 Dec. 28, 2023

(51) Int. Cl.
*A61H 19/00* (2006.01)

(52) U.S. Cl.
CPC ..... *A61H 19/44* (2013.01); *A61H 2201/0207* (2013.01); *A61H 2201/123* (2013.01); *A61H 2201/1238* (2013.01)

(58) Field of Classification Search
CPC ............ A61H 19/44; A61H 2201/0207; A61H 2201/123; A61H 2201/1238
See application file for complete search history.

(56) References Cited

U.S. PATENT DOCUMENTS 9,649,130 B2 5/2017 Parys
2005/0055043 A1 3/2005 Foltz et al.
2010/0082057 A1 4/2010 Borkon
2011/0295302 A1* 12/2011 Mohl .................. A61M 60/515 606/194
2014/0088468 A1* 3/2014 Murison ................ A61H 23/04 601/150
2014/0336452 A1* 11/2014 Shahoian ............... A61H 19/32 600/38
2015/0133727 A1 5/2015 Bacich et al.
2017/0143944 A1 5/2017 Harpaz et al.

FOREIGN PATENT DOCUMENTS

WO 9728840 A1 8/1997

OTHER PUBLICATIONS

PCT Search Report and Written Opinion for PCT/US23/25198; Sep. 20, 2023.

* cited by examiner

*Primary Examiner* — Joel Lamprecht
(74) *Attorney, Agent, or Firm* — Stetina Garred Brucker & Newboles

(57) ABSTRACT

Enhanced dilatation devices are contemplated which incorporation of a number of new features, principally among them an actuator for producing reciprocating linear motion in at least the insertion end of the dilatation device to aid in, automate, and enhance the dilatation and/or sexual stimulatory function of the dilatation device, and a rear rigid arcuate member configured for placement over an anatomical surface such as the mons pubis or the perineum, and an expansion region incorporating an expanding balloon on its inner arcuate face configured to expand against and frictionally engage with the anatomical surface to assist with retaining the dilatation device in place during use. Such enhanced dilatation devices may be embodied by a new dilatation device, or may be implemented in the form of an optional attachment which may be used to upgrade an existing dilatation device.

20 Claims, 5 Drawing Sheets

DILATATION DEVICES INCORPORATING ENHANCED FEATURES

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to the field of dilatation devices for therapeutic and recreational purposes. More particularly, the present disclosure relates to superior dilatation devices and methods of using such devices which incorporate enhanced features to better automate the functionality and performance of such dilatation devices, as well as for providing enhanced levels of sexual stimulation.

2. Related Art

There are a number of reasons for which an individual may utilize a device configured for insertion into the vagina or anus. Medically, there are a number of disorders that involve the pelvic area, including of the bladder, vagina, pelvic floor muscle, rectum and cervix, for which insertion of devices for therapeutic treatment is a common method of treatment. Likewise, such devices are often used for sexual stimulation purposes. Notably, the disclosure of Applicant's prior filed U.S. patent application Ser. No. 17/655,761, entitled IMPROVED DILATATION DEVICE INCORPORATING INFLATABLE BALLOON, and Applicant's prior filed U.S. patent application Ser. No. 17/646,309 entitled ENHANCED PROPHYLACTICS FOR VACUUM THERAPY are important to complete understanding of the disclosure made herein, and accordingly, the entire disclosure of each is incorporated herein as if fully restated.

The pubococcygeal muscle, commonly called the pelvic floor muscle, is responsible for holding all the pelvic organs within the pelvic cavity. The pelvic floor muscle consists of a deep muscle layer and a superficial muscle layer that work together to keep the pelvic organs healthy and in good working order. The muscle is suspended at the base of the pelvis and wraps around the vagina and rectum. The pelvic floor muscles may become damaged or weakened through childbirth, lack of use, aging, illness, or as the collateral result of surgical procedures. One of the symptoms related to a weakening of these muscles is urinary incontinence.

Other pelvic disorders include chronic pelvic pain and vulvodynia (pelvic muscle dysfunction), which may sometimes be experienced by young adult women. These disorders may be caused by involuntary contractions (spasms) of the levator ani and perineal muscles. This condition, sometimes referred to as vaginismus or pelvic floor tension myalgia, may be accompanied by difficult and painful penetration of the vagina (dyspareunia), often resulting in pain and other difficulties which substantially reduce a woman's quality of life, not only with regard to the participating in and enjoyment of penetrative sexual intercourse, but also in other facts of life, such as in the use of menstrual products such as tampons or during routine procedures such as the use of speculums during gynecological examinations.

Dilatation devices are commonly prescribed for the treatment of such conditions, and generally include products such as vaginal dilators and Kegel exercisers. Similarly, dilatation devices for insertion into the anus may also be prescribed, for example, in order to aid in treatment of conditions such as anal stenosis, where treatment involves progressive stretching and acclimation of the rectum to an ideal size to improve comfort and function following anorectal procedures, such as following surgeries on the prostate or for hemorrhoids.

Similarly, dilatation devices are also used for the enhancement of sexual pleasure, and in this context, such devices generally are referred to as sex toys. There may also be substantial overlap between the structure and functionality of devices adapted for therapeutic and recreational uses, and in many cases, especially when a pelvic disorder may directly impact the ability to enjoy sexual intercourse and pleasure, a single device may be utilized for both purposes. Many types of sex toys are known. Some of the most popular sex toys are designed for vaginal or anal insertion, and include items such as dildos, prostate stimulators, anal plugs, etc. Many of these devices may also include other stimulatory elements, such as vibrating or rotating functionalities.

Existing dilatation devices suffer from a number of deficiencies, however. For example, conventional treatment of vaginismus or anal stenosis typically entails the progressive insertion of a progressively larger sequence of dilators until the vagina or anus becomes acclimated to the desired size. It is therefore desirable to have improved dilatation devices which may, for example, provide adaptive forms of dilatation therapies, potentially even taking into consideration biofeedback mechanisms, in order to assist in user comfort and to eliminate the requirement for the use of a series of dilators. Likewise, similar deficiencies may exist in the field of sex toys, and consequently, overall sexual pleasure may be enhanced the application of similar techniques to produce improved sex toys for insertion.

BRIEF SUMMARY

To solve these and other problems, an enhanced dilatation device is contemplated in which the device of Applicant's prior filed U.S. patent application Ser. No. 17/655,761, or other less novel devices, may have their functionality enhanced via the addition or incorporation of a number of features, principally among them an actuator for producing reciprocating linear motion in at least the insertion end of the dilatation device to aid in, automate, and enhance the dilatation and/or sexual stimulatory function of the dilatation device, and a rear rigid arcuate member configured for placement over an anatomical surface such as the mons pubis or the perineum, and an expansion region incorporating an expanding balloon on the inner arcuate face of the rear rigid arcuate member, which is configured to expand against and frictionally engage with the anatomical surface to assist with retaining the dilatation device in place during use. It is contemplated that such features can be incorporated in a new dilatation device, or may be implemented in the form of an optional attachment which may be used to upgrade an existing dilatation device. It is further contemplated that additional beneficial effects may be produced via other optional enhancements within the enhanced dilatation device, such as vibratory or heating elements.

According to one exemplary embodiment of an enhanced dilatation device, the enhanced dilatation device may comprise a forward rigid elongate member defining a longitudinal axis and having a first junction region, a insertion end, and a shaft region therebetween, the forward rigid elongate member comprising an elongate member sheath secured to and at least partially enclosing at least a portion of an exterior of the shaft region, the sheath having a first outer surface and a first inflation lumen, the first inflation lumen being transitionable between inflated and deflated configurations, wherein transitioning of the first inflation lumen to its inflated configuration is operative to cause a first inflation portion of the first outer surface to expand away from the exterior of the shaft region, and wherein transitioning of the first inflation lumen to its deflated configuration is operative to cause the inflation portion of the first outer surface to retract towards the exterior of the shaft region; a rear rigid arcuate member having a second junction region, an expansion region, and an arcuate region therebetween, the expansion region having a second outer surface and a second inflation lumen, the second inflation lumen being transitionable between inflated and deflated configurations, wherein transitioning of the second inflation lumen to its inflated configuration is operative to cause a second inflation portion of the second outer surface to expand away from the exterior of the expansion region, and wherein transitioning of the second inflation lumen to its deflated configuration is operative to cause the second inflation portion of the second outer surface to retract towards the exterior of the expansion region; an actuator operative to linearly extend and retract at least the insertion end of the forward rigid elongate member along the longitudinal axis independent of the remainder of the enhanced dilatation device; at least one reservoir operative to contain inflation fluid; a first conduit and a second conduit, each of the first and second conduits defining a respective first and second inflation fluid pathway between one of the at least one reservoir and a respective one of the first and second inflation lumens; at least one pump associated with the first and second inflation fluid pathways, each pump being operative to regulate the flow of inflation fluid between at least one of the at least one reservoir and at least one of the first and second inflation lumens, a net flow of inflation fluid from a reservoir into an inflation lumens being associated with the transition of that inflation lumen to its inflated configuration, and a net flow of inflation fluid from an inflation lumen into a reservoir being associated with the transition of the inflation lumen to its deflated configuration; and one or more control units operative to control the operation of the at least one pump and the operation of the actuator; wherein the rear rigid arcuate member is connected to the forward rigid elongate member at a junction interface of the first and second junction regions.

In the exemplary embodiment of an enhanced dilatation device, the at least one reservoir may comprise a first and a second reservoir, wherein the first reservoir is enclosed within the forward rigid elongate member with the first conduit defining the first inflation fluid pathway between the first reservoir and the first inflation lumen, and wherein the second reservoir is enclosed within the rear rigid arcuate member with the second conduit defining the second inflation fluid pathway between the second reservoir and the second inflation lumen.

In the exemplary embodiment of an enhanced dilatation device, the at least one reservoir may comprise a first reservoir enclosed within the forward rigid elongate member, with the first conduit defining the first inflation fluid pathway between the single reservoir and the first inflation lumen, and the second conduit defining the second inflation fluid pathway between the single reservoir and the second inflation lumen.

In the exemplary embodiment of an enhanced dilatation device, the actuator may be positioned within the forward rigid elongate member, and may be configured to linearly extend and retract the insertion end of forward rigid elongate member along the longitudinal axis independent of the remainder of the enhanced dilatation device. Alternatively, the actuator may be positioned within the forward rigid elongate member or within the rear rigid arcuate member, and may be configured to linearly extend and retract the forward rigid elongate member along the longitudinal axis independent of the remainder of the enhanced dilatation device.

In the exemplary embodiment of an enhanced dilatation device, the control unit may be operative to control the actuator and the at least one pump operative to regulate the flow of inflation fluid between the at least one reservoir and the first inflation lumen such that they operate in synchronization with one another. The control unit may also be operative to cause the actuator to extend at least the insertion end of the forward rigid elongate member in synchrony with the transition of the first inflation lumen to the inflated configuration, and to cause the actuator to retract at least the insertion end of the forward rigid elongate member in synchrony with the transition of the first inflation lumen to the deflated configuration.

In the exemplary embodiment of an enhanced dilatation device, the rear rigid arcuate member may be integrally connected to the forward rigid elongate member at the junction interface of the first and second junction regions, or may be detachably connectible to the forward rigid elongate member at the junction interface of the first and second junction regions. In embodiments in which the rear rigid arcuate member is detachably connectible to the forward rigid elongate member, the junction interface of the first and second junction regions may further comprise one or more transmission elements for transmitting, between the forward rigid elongate member and the rear rigid arcuate member across the junction interface, one or more selected from: electrical power, electrically propagated signals, mechanical power, mechanically propagated signals, hydraulic power, hydraulically promulgated signals, pneumatic power, pneumatically promulgated signals, inflation fluid, or combinations thereof.

According to further contemplated certain variations of an enhanced dilatation device in which the forward rigid elongate member is not integrally connected to the rear rigid arcuate member, the enhanced dilatation device may be further configurable to enable the attachment of two forward rigid elongate members in opposed directions at the junction interface of their respective first junction regions. When two forward rigid elongate members are configured to be attached in opposed directions at the junction interface of their respective first junction regions in such a fashion, it is further contemplated that at least one actuator may be operative to linearly extend and retract at least the insertion end of at least one of the forward rigid elongate members along the longitudinal axis of that forward rigid elongate member independent of the other forward rigid elongate member. Furthermore, the respective first junction regions of the two forward rigid elongate members may further comprises one or more transmission elements for transmitting, between the two forward rigid elongate members across the junction interface, one or more selected from: electrical power, electrically propagated signals, mechanical power, mechanically propagated signals, hydraulic power, hydraulically promulgated signals, pneumatic power, pneumatically promulgated signals, inflation fluid, or combinations thereof.

In the exemplary embodiment of an enhanced dilatation device, it is further contemplated that one or more vibratory elements may be included within the forward rigid elongate member or the rear rigid arcuate member. Similarly, one or more heating elements may be included within the forward rigid elongate member or the rear rigid arcuate member, and one or more sensory elements may be included within the forward rigid elongate member or the rear rigid arcuate member.

According to another exemplary embodiment of the disclosure herein, an attachment for a dilatation device having at least a first junction region and an insertion end, and defining a longitudinal axis is contemplated, with the attachment comprising a rear rigid arcuate member having a second junction region operative to connect to the first junction region, an expansion region, and an arcuate region therebetween, the expansion region having an outer surface and an inflation lumen, the inflation lumen being transitionable between inflated and deflated configurations, wherein transitioning of the inflation lumen to its inflated configuration is operative to cause an inflation portion of the outer surface to expand away from the exterior of the expansion region, and wherein transitioning of the inflation lumen to its deflated configuration is operative to cause the inflation portion of the outer surface to retract towards the exterior of the expansion region; a reservoir operative to contain inflation fluid; a conduit defining an inflation fluid pathway between the reservoir and the inflation lumen; a pump associated with the inflation fluid pathway, the pump being operative to regulate the flow of inflation fluid between the reservoir and the inflation lumen, a net flow of inflation fluid from the reservoir into the inflation lumen being associated with the transition of the inflation lumen to its inflated configuration, and a net flow of inflation fluid from the inflation lumen into the reservoir being associated with the transition of the inflation lumen to its deflated configuration; and one or more control units operative to control the operation of the pump.

The contemplated attachment may further comprise an actuator within the rear rigid arcuate member operative to linearly extend and retract at least the insertion end of the dilatation device independent of the rear rigid arcuate member along the longitudinal axis. The control unit may be further operative to control the operation of the actuator.

In the contemplated attachment, the second junction region may also further comprise one or more transmission elements for transmitting, between the dilatation device and the rear rigid arcuate member, one or more selected from: electrical power, electrically propagated signals, mechanical power, mechanically propagated signals, hydraulic power, hydraulically promulgated signals, pneumatic power, pneumatically promulgated signals, inflation fluid, or combinations thereof.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

According to various aspects of the present disclosure, new and improved dilatation devices are contemplated which incorporation additional features including an actuator for producing reciprocating linear motion in at least the insertion end of the dilatation device to aid in, automate, and enhance the dilatation and/or sexual stimulatory function of the dilatation device, and a rear rigid arcuate member configured for placement over an anatomical surface such as the mons pubis or the perineum, and an expansion region incorporating an expanding balloon on its inner arcuate face configured to expand against and frictionally engage with the anatomical surface to assist with retaining the dilatation device in place during use. Such enhanced dilatation devices may be embodied as stand-alone full dilatation devices, or may be implemented in the form of retrofittable or removable attachments which may be used to upgrade an existing dilatation device. It is further contemplated that additional beneficial effects may be produced via other optional enhancements within the enhanced dilatation device, such as vibratory or heating elements.

Figure 1:
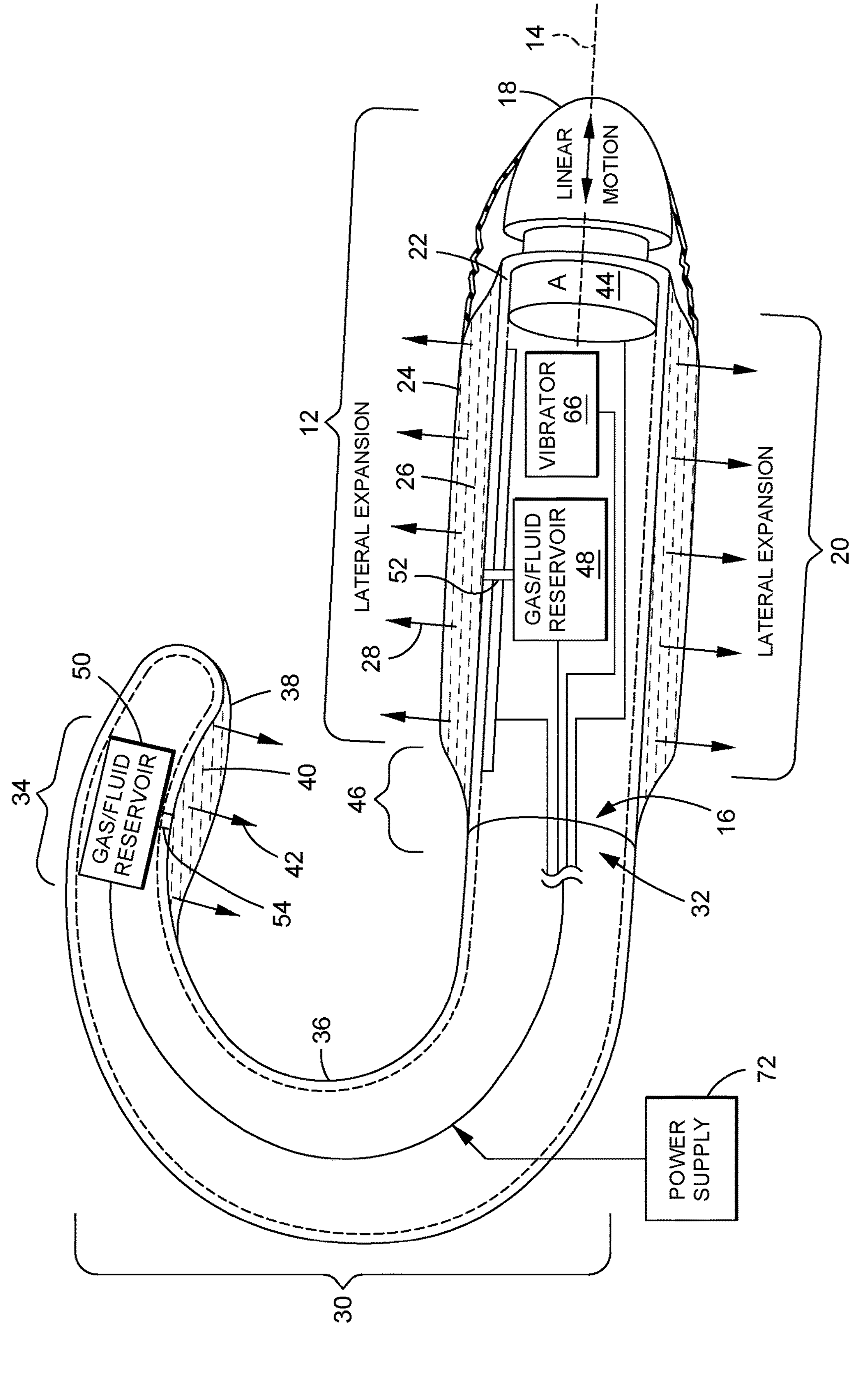
FIG. 1 is a side cutaway view illustrating an enhanced dilatation device according to a first exemplary embodiment of the present disclosure.

Turning now to FIG. 1, a side cutaway view illustrating an enhanced dilatation device 10 according to a first exemplary embodiment of the present disclosure is shown. As may be seen, an enhanced dilatation device 10 may comprise a forward rigid elongate member 12 defining a longitudinal axis 14, and having a first junction region 16, and insertion end 18, and a shaft region 20 therebetween. The shaft region 20 may be surrounded by an elongate member sheath 22 having a first outer surface 24 and a first inflation lumen 26. The general structure and principle of operation of the forward rigid elongate member 12 may be best understood by review of Applicant's earlier filed U.S. patent application Ser. No. 17/655,761, entitled IMPROVED DILATATION DEVICE INCORPORATING INFLATABLE BALLOON, in which these interrelation between these features are described in substantial detail, all of the teachings of which are incorporated herein as if expressly restated in their entirety.

The enhanced dilatation device 10 according to the first exemplary embodiment is also contemplated to comprise a rear rigid arcuate member 30, which may be seen to incorporate a second junction region 32, an expansion region 34, and an arcuate region 36 therebetween. The expansion region 32 of the rear rigid arcuate member 30 further may be seen to incorporate a second outer surface 38 and a second inflation lumen 40.

The forward rigid elongate member 12 may be any type of rigid elongate member generally shaped and sized for insertion into a body cavity for use as a dilatation device or other form of sex toy. In particular, is it contemplated that the forward rigid elongate member 12 may, in the exemplary embodiment, be a generally linear ovoid shape, similar to many conventional dilator or dildo products currently offered for sale. As such, accordance with the generally linear shape contemplated, it may be seen that the forward rigid elongate member 12 may generally define a longitudinal axis 14. However, it may be seen that the longitudinal axis 14 need not entirely correspond to the general shape of the forward rigid elongate member 12. Rather, the longitudinal axis 14 should be considered to be defined primarily by the direction of linear motion as enabled by the overall function of the enhanced dilatation device 10 that is one of the objects of the present disclosure. For example, it may be seen that in embodiments such as those shown in FIG. 1, in which only the insertion end 18 may be traversed during the linear motion, such longitudinal axis will likely be defined by the general direction of traversal of the insertion end. It may be seen, however, that the shape, size, and exterior features of the forward rigid elongate member 12 may be substantially variable or customized, similar to the way that many conventional dilator or dildo products are also varied, including in size, shape, curvature, style, color, etc. For example, while in the illustrated embodiments the forward rigid elongate member 12 has a generally circular cross-section similar to many dilator and dildo products, other cross-sectional shapes are expressly contemplated as being within the scope and spirit of the present disclosure. The exact configuration of the forward rigid elongate member 12 is not necessarily to be limited, and as long as the enhanced dilatation device 10 incorporating the forward rigid elongate member 12 is suitable for insertion by an individual for treatment of a pelvic condition or for the enhancement of sexual pleasure. Likewise, the exact material of the forward rigid elongate member 12 should not necessarily be limited to any particular material. For example, plastics, rubber, composites, metals, woods, glasses, ceramics, or any other material may be seen as suitable for use. It should be considered within the scope and spirit of the present disclosure. It should also be appreciated that the term "rigid" is not necessarily an absolute term, and that it is not necessary that the forward rigid elongate member 12 be totally rigid in the sense that it will not be able to flex or bend or deform. Rather, the term "rigid" in the rigid elongate member forward 12 and as used elsewhere herein should be understood by way of comparison to the material of the elongate member sheath 22, in that the forward rigid elongate member 12 should be understood in context of the function of the core aspects of the disclosure, i.e. that it should be less flexible and less deformable than those material used by the certain portions of the elongate member sheath 22, that are expressly contemplated as being capable of flexing and deforming between a deflated and inflated configuration, in the fashion of a balloon expanding and contracting.

The forward rigid elongate member 12 is contemplated as having an insertion end 18, and a first junction region 16, and a shaft region 20 therebetween. Generally, it is contemplated that the shaft region 20 will be at least partially enclosed by the elongate member sheath 22, while the first junction region 16 and the insertion end 18 will not necessarily be enclosed by the elongate member sheath 22. It is generally contemplated that insertion end 18 will be the region, which is first inserted by the user, and as such, it may be seen that it may be configured so as to assist in such insertion. However, the exact form of the insertion end 18 is not necessarily limited in any such fashion, and configurations of the insertion end 18 other than those described herein are expressly contemplated as encompassed by this disclosure, which should not be construed to limit the scope or spirit of the present disclosure.

The shaft region 20 is contemplated as representing the region of the forward rigid elongate member 22 between the first junction region 16 and the insertion end 18. Similar to the above definitions, the shaft region 20 is likewise not necessarily strictly defined in form, and does not necessarily need to be generally linear and straight-walled in the manner pictured in the illustrated embodiments, but many also be curved, arcuate, undulate, otherwise irregularly shaped, without departing from the scope and spirit of the present disclosure.

The elongate member sheath 22 is contemplated as being secured to and at least partially enclosing at least a portion of the exterior of the shaft region 20. According to the exemplary embodiment, the elongate member sheath 22 is contemplated as comprising one or more first outer surface 24, one or more first inflation lumen 26, and one or more first inflation portions 28. As shown in the exemplary embodiment, the elongate member sheath 22 may extend to and partially cover the insertion end 18 of the forward rigid elongate member 12 and may fully enclose the shaft region 20. However, it may be seen that the sheath 20 may not necessarily cover and enclose all or even most of the shaft region 20, nor entirely surround the perimeter of the forward rigid elongate member 12. For example, it may be seen that the insertion end 18 of the forward rigid elongate member 12 may be exposed in certain embodiments, and the elongate member sheath 22 may only be positioned over certain portions of the shaft region 20. The first outer surface(s) 24 of the elongate member sheath 22 may typically be formed of a material which will not result in discomfort to the user when used, and may, in certain embodiments, be a flexible, stretchable material that is generally impermeable to the passage of gases or liquids, such as natural or synthetic rubbers, latex, or nylon. However, it may also be seen that other materials may be utilized which might not necessarily be required to be generally impermeable to the passage of gases or liquids, as long as the first inflation lumen 26 is itself generally impermeable to the passage of gases or liquids, which may be achieved by the incorporation of a lining or coating on the surfaces thereof. Likewise, it is also contemplated that the elongate member sheath 22 and/or the first outer surface 24 may be formed of multiple types or of materials or different configurations or thicknesses of a single material, for example, a more resilient, less deformable material may be utilized at regions which are not configured to deform substantially (e.g. the regions covering the insertion end 18 in the illustrated embodiment), while a substantially more deformable material may be utilized at the inflation first inflation portion 28 where the first outer surface 24 is configured to expand outwards during inflation of the first inflation lumen 26.

The first inflation lumen 26 and the first inflation portion 28 are contemplated to function in coordination to cause the first outer surface(s) 24 positioned at the first inflation portion(s) 28 to expand away from the exterior of the shaft region 20 at predetermined locations when the first inflation lumen 26 is transitioned to the inflated configuration, and to likewise to cause the first outer surface(s) 22 at the first inflation portion(s) 28 to retract towards the exterior of the shaft region 20 when the first inflation lumen(s) 26 is transitioned to the deflated configuration. As may be seen, the structure of the first inflation lumen(s) 26 and the first inflation portion(s) 26 will generally dictate the form in which this will take. In the exemplary embodiment shown in FIG. 1, the first inflation lumen 26 may be seen to entirely encircle the shaft region 20 such that there is only a single continuous first inflation lumen 26 which extends along nearly the entire length of the shaft region 20, with the first inflation portion 28 representing substantially all of the first outer surface 24 above the first inflation lumen 26. Thus, it may be seen that when the first inflation lumen 26 is inflated, the first outer surface 28 will tend to expand outwards substantially equally in all directions, resulting in the effective cross-sectional diameter of the forward rigid elongate member 12 being essentially increased along in all dimensions along nearly the entirety of the shaft region 20 that constitutes the first inflation portion 28. However, it may also be seen that different configurations of the first inflation lumen(s) 26 and first inflation portion(s) 28 may result in different resultant shapes and sizes of the device when transitioned to the inflated state, and that such different configurations are expressly contemplated as being within the scope and spirit of the present disclosure. For example, it may be seen that by positioning first inflation lumen(s) 26 or first inflation portion(s) 28 at only particular locations around or along the shaft region 20, or by configuring such elements in different ways, the first outer surface(s) 24 may be configured to only expand outwards at certain locations, or to expand outwards more substantially at certain locations compared to other locations. In this fashion, for example, it may be seen that it would be possible to achieve many different particularized expansion effects, and that such effects may be more or less beneficial according to the particular purpose and configuration of the enhanced dilatation device 10. For example, it may be desired to for the device to expand more substantially along one plane and less substantially along another plane, or at certain distances along the shaft region 20 compared to others, so as to achieve, for example, an undulate effect which may result in enhanced dilatation effect or sexual pleasure. All of these different configurations are to be considered within the scope of and spirit for the present disclosure.

The rear rigid arcuate member 30 may be any type of rigid arcuate member generally shaped and sized to be configured for placement over an anatomical surface such as the mons pubis or the perineum when the forward rigid elongate member 12 is inserted into a body cavity for use as a dilatation device or other form of sex toy. In particular, is it contemplated that the rear rigid arcuate member 30 may, in the exemplary embodiment, be a generally curved arcuate shape configured to conform to the typical curvature of the female mons pubis or of the perineum when the forward rigid elongate member 12 inserted into the vagina or anus, permitting a dorsal or a ventral placement, according to user preference. It may be seen, however, that the shape, size, and exterior features of the rear rigid arcuate member 30 may be substantially variable or customized, similar to the way that many conventional dilator or dildo products are also varied, including in size, shape, curvature, style, color, etc. For example, while in the illustrated embodiments the rear rigid arcuate member 30 has a generally circular cross-section, other cross-sectional shapes are expressly contemplated as being within the scope and spirit of the present disclosure. The exact configuration of the rear rigid arcuate member 30 is not necessarily to be limited, and as long as the rear rigid arcuate member 30 suitable placement over an atomical surface such as the mons pubis or the perineum when the forward rigid elongate member 12 is inserted into a body cavity. Likewise, the exact material of the rear rigid arcuate member 30 should not necessarily be limited to any particular material. For example, plastics, rubber, composites, metals, woods, glasses, ceramics, or any other material may be seen as suitable for use. It should be considered within the scope and spirit of the present disclosure. It should also be appreciated that the term "rigid" is not necessarily an absolute term, and that it is not necessary that rear rigid arcuate member 30 be totally rigid in the sense that it will not be able to flex or bend or deform. Rather, the term "rigid" in the rear rigid arcuate member 30 and as used elsewhere herein should be understood by way of comparison to the material of the second inflation portion(s) 42, in that the rear rigid arcuate member 30 should be understood in context of the function of the core aspects of the disclosure, i.e. that it should be less flexible and less deformable than those material used by second inflation portion(s) 42 that are expressly contemplated as being capable of flexing and deforming between a deflated and inflated configuration, in the fashion of a balloon expanding and contracting.

The rear rigid arcuate member 30 is contemplated as having a second junction region 32, an expansion region 34, and an arcuate region 34 therebetween. Generally, it is contemplated that the arcuate region 34 will be arcuately curved so as to define the general shape of the rear rigid arcuate member 30. However, the exact form of the arcuate region 34 is not necessarily limited in any such fashion, and configurations of the arcuate region 34 other than those described or illustrated herein are expressly contemplated as encompassed by this disclosure, and may be curved, arcuate, undulate, otherwise irregularly shaped, without departing from the scope and spirit of the present disclosure.

The expansion region 34 is contemplated as being secured to and at least partially enclosing at least a portion of the exterior of the rear rigid arcuate member 30. According to the exemplary embodiment, the expansion region 34 is contemplated as comprising one or more second outer surface(s) 38, one or more first inflation lumen(s) 40, and one or more second inflation portion(s) 42. As shown in the exemplary embodiment illustrated in FIG. 1, the expansion region 34 may be positioned near the end of the rear rigid arcuate member 30 on a concave side. However, it may be seen that the expansion region 34 may not be positioned in this fashion. For example, it may be seen that the expansion region 34 may be position in other fashions, such as on all sides of the rear rigid arcuate member 30, or on an end of the rear rigid arcuate member 30, which may be desirable in more extremely curved embodiments, or on a more exotically designed surface of the rear rigid arcuate member 30 specifically provided for the expansion region 34.

The second outer surface(s) 38 of the expansion region 34 may typically be formed of a material which will not result in discomfort to the user when used, and may, in certain embodiments, be a flexible, stretchable material that is generally impermeable to the passage of gases or liquids, such as natural or synthetic rubbers, latex, or nylon. However, it may also be seen that other materials may be utilized which might not necessarily be required to be generally impermeable to the passage of gases or liquids, as long as the second inflation lumen 40 is itself generally impermeable to the passage of gases or liquids, which may be achieved by the incorporation of a lining or coating on the surfaces thereof. Likewise, it is also contemplated that the expansion region 34 and/or the second outer surface(s) 38 may be formed of multiple types or of materials or different configurations or thicknesses of a single material, for example, a more resilient, less deformable material may be utilized at regions which is not configured to deform substantially. Furthermore, it is expressly contemplated that according to certain embodiments, it may be desirable for the second outer surface(s) 38 to be formed of a material selected, textured, or otherwise configured to frictionally engage with the anatomical surface to assist with retaining the enhanced dilatation device 10 in place when the forward rigid elongate member 12 is inserted into a body cavity for use as a dilatation device or other form of sex toy. Specifically, it may be seen that the expansion of the expansion region 34 as described herein against the anatomical surface, in combination with the use of a material selected, textured, or otherwise configured to frictionally engage with the anatomical surface, will result in enhanced retention during use of the enhanced dilatation device 10, reducing the requirement for manual retention of the enhanced dilatation device 10 by the use while in use.

The second inflation lumen(s) 40 and the second inflation portion(s) 42 are contemplated to function in coordination to cause the second outer surface(s) 38 at the second inflation portion(s) 42 to expand away from the exterior of the expansion region 34 at predetermined locations when the second inflation lumen(s) 40 is transitioned to the inflated configuration, and to likewise to cause second outer surface(s) 38 at the second inflation portion(s) 42 to retract towards the exterior of the expansion region 34 when the second inflation lumen(s) 40 is transitioned to the deflated configuration. As may be seen, the structure of the second inflation lumen(s) 40 and the second inflation portion(s) 42 will generally dictate the form in which this will take. In the exemplary embodiment shown in FIG. 1, the second inflation lumen(s) 40 may be seen to be positioned on the inner concave side of the rear rigid arcuate member 30 at its end, with the second inflation portion 42 representing substantially all of the second outer surface 38 positioned above the second inflation lumen 40. Thus, it may be seen that according this described and illustrated embodiment, when the inner concave side of the rear rigid arcuate member 30 is positioned against an anatomical feature, with the forward rigid elongate member 12 is inserted into a body cavity for use as a dilatation device or other form of sex toy, and when the second inflation lumen 40 is inflated, the second outer surface 38 will tend to expand in the direction towards the anatomical feature, resulting in an enhanced anchoring of the rear rigid arcuate member 30 against the anatomical feature. However, it may also be seen that different configurations of the second inflation lumen(s) 40 and second inflation portion(s) 42 of the second outer surface(s) 38 may result in different resultant shapes and sizes of the second outer surface when transitioned to the inflated state, and that such different configurations are expressly contemplated as being within the scope and spirit of the present disclosure. For example, it may be seen that by positioning a series of second inflation portion(s) 42 at particular and/or multiple locations along the rear rigid arcuate member 30 at the expansion region, or by configuring the elements in different ways, the anchoring effect achieved may be modified or enhanced. Furthermore, it may be seen that other configurations may result in the second outer surface(s) 38 of the expansion region 34 may be configured to only expand outwards at multiple locations simultaneously, or to expand outwards at particular select locations and not at other locations at any given time. In this fashion, for example, it may be seen that it would be possible to achieve many different particularized expansion effects, and that such effects may be more or less beneficial according to the particular purpose and configuration of the enhanced dilatation device 10. For example, it may be desired for particular second outer surface(s) 38 of the expansion region 34 device to expand more substantially at certain times, or at certain distances along the expansion region 34 compared to others, so as to achieve, for example, an undulate effect which may result in enhanced anchoring or sexual pleasure via, for example, application of pressure or friction to the underlying anatomical region against which the rear rigid arcuate member 30 is anchored. All of these different configurations are to be considered within the scope of and spirit for the present disclosure.

Within the enhanced dilatation device 10 may also be seen to be an actuator 44 operative to linearly extend and retract at least the insertion end 18 of the forward rigid elongate member 12 along the longitudinal axis independent of the remainder of the enhanced dilatation device 10 to produce linear motion thereof. It may be seen that the actuator 44 maybe any actuator which may be operative to produce linear or push/pull motion, including but not limited to mechanical, electromechanical, hydraulic, pneumatic, and piezoelectric actuators 44, as well as other types of actuators known or future developed. For example, it may be seen that in different embodiments, it may be desirable to utilize an electromechanical actuator 44 which operates off of a power source within the device, or to utilize a hydraulic or pneumatic actuator 44 which may operate using the inflation fluid within one of the reservoirs, or within a separate reservoir or pneumatic/hydraulic system. According to the exemplary embodiment, it may be seen that the actuator 44 may be positioned within the forward rigid elongate member 12 proximate to the insertion end 18 for directly acting upon the insertion end 18. As such, it may be seen that the insertion end 18 may accordingly extend and retract when the actuator 44 is activated. As may be seen by the illustration, a portion of the first outer surface 24, or alternatively the elongate member sheath 22, may extend to the insertion end 18 and may be configured to accommodate the linear motion of the insertion end 18 without exposing the underlying structural elements of the actuator 44 or the coupling with the insertion end 18, such as by using an elastic material and/or configuring the material structure in an accordion-like fashion to permit it to better accommodate and endure such motion, which may be to the benefit of user safety and comfort and to lengthen the lifetime of the device. However, it may be also seen that the actuator 44 need not be positioned proximal to the insertion end 18, even if the insertion end is the only portion which will undergo linear motion. For example, the actuator 44 may be positioned within the insertion end itself, or at a location within the forward rigid elongate member 12 substantially distant to the insertion end 18, and may transmit the forces to the insertion end remotely, such as via a hydraulic or pneumatic circuit, or via a push-rod, or via any other devisable scheme for enabling linear motion of the insertion end 18. The variations may be seen to be substantial, and it may should be understood that such variations are contemplated as within the scope and spirit of the present disclosure.

Likewise, it may be seen that other arrangements of actuator are possible which may produce linear motion of at least the insertion end 18 in other ways. For example, it may be seen that the actuator 44 may be positioned within either of the forward rigid elongate member 12 or the rear rigid arcuate member 30, in such a fashion as to transmit the forces which result in linear motion of at least the insertion end to the other component. In this way, which will be better understood with reference to FIGS. 2 and 3, it may be seen that the entire forward rigid elongate member 12 may undergo the linear motion that is an important feature of the present disclosure, and not just the insertion end 18. Further, as will be further discussed in relation to FIG. 3, it may be substantially desirable to position the actuator 44 within a rear rigid arcuate member 30 that configured to be removably detachable from the forward rigid elongate member 12, which may enable the rear rigid arcuate member 30 to be embodied as an upgradable or a retrofittable component which may convert a forward rigid elongate member 12 that itself is not capable of producing the desired linear motion into an enhanced dilatation device 10 as contemplated herein which is capable of producing linear motion.

In relation thereto, it should be appreciated that a junction interface 46 will be located at the connection of the first junction region 16 of the forward rigid elongate member 12, and the second junction region 32 of the rear rigid arcuate member 30. As may be seen by the first exemplary embodiment shown in FIG. 1, the junction interface may be nominal and entirely seamless, especially in an embodiment of an enhanced dilatation device 10 where the forward rigid elongate member 12 and the rear rigid arcuate member 30 are formed to be entirely unitary. In this fashion, it may be seen that the internal space within each device may be substantially shared, which may be desirable as it may permit, for example, a simplified construction of the device which be powered via use of a single power source, or for inflation fluid within one or more reservoir to be shared in a single volume, rather than requiring individual discrete volumes, or even for both the first and second inflation lumens to be controlled with a single pump. However, it may be seen that in other embodiments, such as those shown in FIGS. 2-3, other configurations may be utilized in which the junction interface 46 may not be unitary or seamless. For example, it may be desired for the first and second junction regions 16, 32 to be permanently connected via a mechanism of the actuator 44 for transmitting linear force to produce the linear motion, and covered which a similar elastic or deformable material such as in the accordion-like fashion described above. Likewise, it may be seen that it may be desirable for the first and second junction regions 16, 32 to be detachably connectible at the junction interface 46, via any known or future developed systems of mounting together two structural components, including, for example but without limitations, bayonet-type mounts, threaded engagement, or any type of detachable connection, all of which are contemplated as within the scope or spirit of the present disclosure.

According to the first illustrated embodiment shown in FIG. 1, the enhanced dilatation device 10 is further contemplated to include a first and second reservoir 48, 50, a first and second conduit 52, 54, a first and second inflation fluid pathway 56, 58, and at least one pump 60 controlled by at least one control unit 62. In the exemplary embodiment, the first reservoir 48 is enclosed within the forward rigid elongated member 12 and the second reservoir 50 is enclosed within the rear rigid arcuate member 30. However, it may be seen that in other embodiments, the reservoirs may not necessarily be enclosed as such, but may be distinct components, for example, integrated with a separate element which is tethered to the remainder of the enhanced dilatation device 10. Further, it may be seen that according to still other embodiments the reservoirs may not be entirely enclosed within the rigid elongated member 12, but may be only partially or temporarily enclosed within, for example, as in a cartridge or canister attached to the remainder of the enhanced dilatation device, which may be preferable in embodiments where it may be desirable to remove or replace the reservoirs periodically. Such cartridges or canisters may be, for example, similar or identical in appearance and configuration to conventional threaded compressed gas cartridges used in many conventional applications (e.g. $CO_2$ canisters for use in chargers for whip cream dispensers and carbonated beverage dispensers in the food service industry, or liquid nitrogen cartridges for use with cryoprobes or cryopens for cryogenic surgical applications). Along these lines, a retaining area for the reservoirs may be included within the device, which may serve to house the reservoirs and permit them to be more easily accessed by the user or by a technician without otherwise disassembling the device. It is also contemplated that the reservoirs may be replenishable rather than replaceable, for example, via the connection of an external source of inflation fluid to the reservoirs, or by other techniques known in the art for replenishing the contents of a reservoir. A replenishment port or conduit may be included. For example, in the case in which helium is used as the inflation fluid, an external helium source may be connected to the reservoirs to recharge the reservoirs with helium in order to replenish the device. However, according to the first exemplary embodiment illustrated in FIG. 1, it is contemplated that the reservoir 28 will be entirely enclosed and integral within to the device, and that the supply of inflation fluid contained within the reservoirs will continually be recycled between the reservoirs and the inflation lumens during the lifetime of the enhanced dilatation device 10, such that there will be no need to ever refill or replace the supply of inflation fluid during the lifetime of the device. In this fashion, it may be seen that one of the principal advantages of the disclosed embodiments is shown, because the device may be entirely self-contained and may operate in entirely the same fashion with the same compactness as conventional electrical powered dilatation device (e.g. "bullet" style vibrators) and may operate without necessitating replacement of consumables or the use of external sources of inflation fluid, such as hand-actuated pumps, etc. which will detract from the convenience and compactness of the device.

The inflation fluid may be, according to the exemplary embodiments, helium gas. Helium gas is the preferred inflation fluid typically utilized in balloon catheters for procedures such as angioplasty and other catheterized enlargement procedures because helium achieves inflation and deflation very rapidly owing to its low molecular weight, and in the case of leaks, helium gas is generally considered benign and is usually eliminated quickly from the body without negative effects. However, it may be seen that other inflation fluids may be used, without necessarily inhibiting the functionality of the enhanced dilatation device 10, including gases other than helium such as air or nitrogen, or liquids such as water or mineral oil, or colloids such as gels. It may further be seen that the inflation fluid may comprise a combination of a gas and a liquid, such as in the case of distinct first and second reservoirs 48, 50 which independently fluidly connect to the first and second inflation lumens 26, 40. Such as a gas in one lumen/reservoir system, and a liquid in another. It may be appreciated that, for example use of a fluid may more easily enable transmission of vibrations across inflation lumen 24 compared to a gas, which may result in certain qualities of the device being better configured to achieve its intended functionality.

The device may also incorporate first and second conduits 52, 54 defining first and second inflation fluid pathways 56, 58 between respective first and second reservoirs 48, 50 and the first and second inflation lumens 26, 40 may convey the inflation fluid to and from the reservoirs and the inflation lumens during the process of inflation and deflation of the inflation lumens 26, 40. The conduits 52, 54 may be formed of any material suitable for use in fluid conduits, including but not limited to tubing materials conventionally used in microfluidics applications such as polytetrafluoroethylene (PTFE), polyetheretherketone (PEEK), and silicone.

One or more pump(s)60 may be associated with the first and second inflation fluid pathways 56, 58 and may be operative to regulate the flow of inflation fluid between the first and second reservoirs 48, 50 and the first and second inflation lumens 26, 40. The pump(s) 60 may any type of pump operative to cause a flow of inflation fluid at least across any pressure gradient inherent in the construction and operation of the device. According to the preferred embodiment, the pump(s) 60 may be a bidirectional pump operative to transit the inflation fluid in either direction, both to and from the inflation lumens and reservoirs, which may permit rapid inflation and deflation of the inflation lumens 26, 40, while a unidirectional pump in combination with a valve may not necessarily achieve sufficient performance. However, it may be seen that any type(s) or of pump(s) may be utilized which are be operative to regulate flow in the above described fashion, including pumps which may only be unidirectional, and which rely on a pressure gradient to achieve one of inflation or deflation, depending on the configuration of the device, or combinations of unidirectional or bidirectional pumps. It may also be seen that multiple unidirectional pumps may also be utilized with the same circuit, if necessary. Many types of pumps are known in the art which may be of sufficiently compact size with a sufficient flow rate to be contained entirely within an enhanced dilatation device, and such pumps are especially well known in the field of microfluidics. As may be readily seen from the above-described configuration, when an overall net flow of inflation fluid from a reservoir into an inflation lumen occurs, the inflation lumen will transition to the inflated configuration, and when an overall net flow of inflation fluid from the inflation lumen into reservoir occurs, the inflation lumen will transition to the deflated configuration. In this way, it may be generally seen how the inflatable balloon functionality of the device operates.

One or more control unit(s) 62 may be seen to control the operation of at least the pump 60. In the exemplary embodiment, the control unit is contemplated as comprising software or hardware or a combination thereof residing on a microcontroller on an integrated circuit contained within the enhanced dilatation device 10 and in electronic communication with at least the pump(s) 60. However, it may also be seen that the control unit 62 may be remote from the remainder of the enhanced dilatation device 10, such as within a handheld device physically tethered to the remainder of the enhanced dilatation device 10, or partially within the remainder enhanced dilatation device 10 and partially external to it, such as in the case where the control unit may comprise, for example and without limitation, a transponder at the enhanced dilatation device 10 and a remote controller which transmits control instructions thereto. The remote controller may also be, for example, an app on a user's smartphone which connects to the enhanced dilatation device 10 via a wireless receiver within the enhanced dilatation device 10 for receiving control instructions, such as via conventional wireless protocols like Bluetooth.

It is further contemplated that the control unit 62 may control the operation of the actuator 44 to activate, deactivate, or otherwise adjust the various aspects of the linear motion of at least the insertion end 18 caused by the operation of the actuator. Furthermore, it is contemplated exemplary control mechanism are contemplated in which the operation of the actuator may be synchronized with the operation of the pump in order to cause the actuator to extend at least the insertion end of the forward rigid elongate member in synchrony with the transition of the first inflation lumen to the inflated configuration, and to cause the actuator to retract at least the insertion end of the forward rigid elongate member in synchrony with the transition of the first inflation lumen to the deflated configuration. However, it may be seen that other control mechanisms are possible, including those in which the second inflation lumen 40 is independently inflatable from the first inflation lumen 26, and which remains inflated during the entire operation of the device, in which it may, for example but without limitation, automatically inflate upon initial activation of the device, and deflate upon deactivation of the device. It may be seen that this control system may be desirable if the primary goal of the second inflation lumen is to assist in the anchoring of the rear rigid arcuate member 30 against an anatomical region of the user.

It may be further seen that an enhanced dilatation device 10 may also include a stimulatory module such as a vibrational element 66 for transmitting vibrations to the user during use of the device, as in a conventional vibrating sex toy. For example, it may be preferred for the forward rigid elongate member 12 or the rear rigid arcuate member 30 to include regions thereupon which are formed of a material configured to readily transmit vibrations produced by the vibrational element 66 to the user during operation of the device. It may thus be seen that by positioning certain protruding structural elements on the outside of the device at particular locations, for example, stimulation of certain targeted portions of the user's pelvic region may be realized. Additionally, it may be seen that the vibrational element 66 may not be limited to a vibrational element, but may include other forms of targeted stimulation, for example, electrical stimulation targeted at the pelvic floor region. Electric pulse devices are well known in the art for use in pelvic floor stimulation, and it may be readily conceived how the presently disclosed device may be modified to provide electrical stimulation in addition to the balloon functionality which represents is the primary functionality of the disclosure herein. It may be seen that any number of schemes for providing further stimulation via one or more vibrational element 66 known or future invented may be utilized in combination with the presently disclosed embodiments, and that scope and spirit of the disclosure is not meant to be limited to merely those exemplary stimulation schemes disclosed herein.

Figure 2:
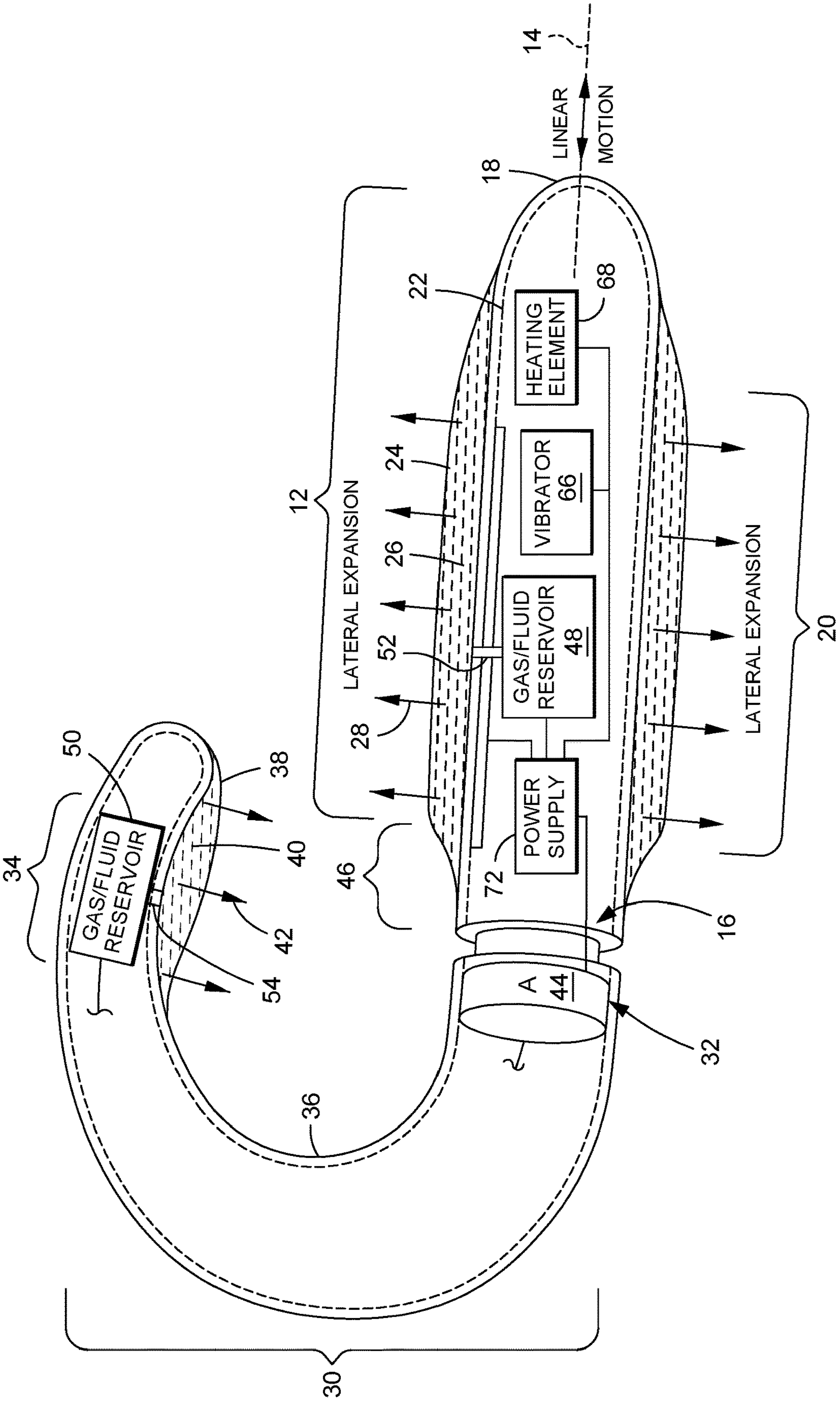
FIG. 2 is a side cutaway view illustrating an enhanced dilatation device according to a second exemplary embodiment of the present disclosure.

Turning now to FIG. 2, a second exemplary embodiment of an enhanced dilatation device 10 is shown in which in a unitary embodiment includes the actuator 44 positioned proximate to the junction interface 46 in order to cause the entire forward rigid elongate member to linearly transit, rather than just the insertion end 18 as in the first exemplary embodiment of FIG. 1.

It may be further seen that an enhanced dilatation device 10 may also include a heating element 68 for transmitting warmth to the user during use of the device. For example, it may be preferred for the forward rigid elongate member 12 or the rear rigid arcuate member 30 to include regions thereupon which are formed of a material configured to readily transmit warmth produced by the heating element 68 to the user during operation of the device. It may thus be seen that by positioning certain structural elements upon the device at particular locations, for example, warming of certain targeted portions of the user's pelvic region may be realized. It may be seen that any number of schemes for providing further heating via one or more heating elements 68 known or future invented may be utilized in combination with the presently disclosed embodiments, and that scope and spirit of the disclosure is not meant to be limited to merely those exemplary stimulation schemes disclosed herein.

Figure 3:
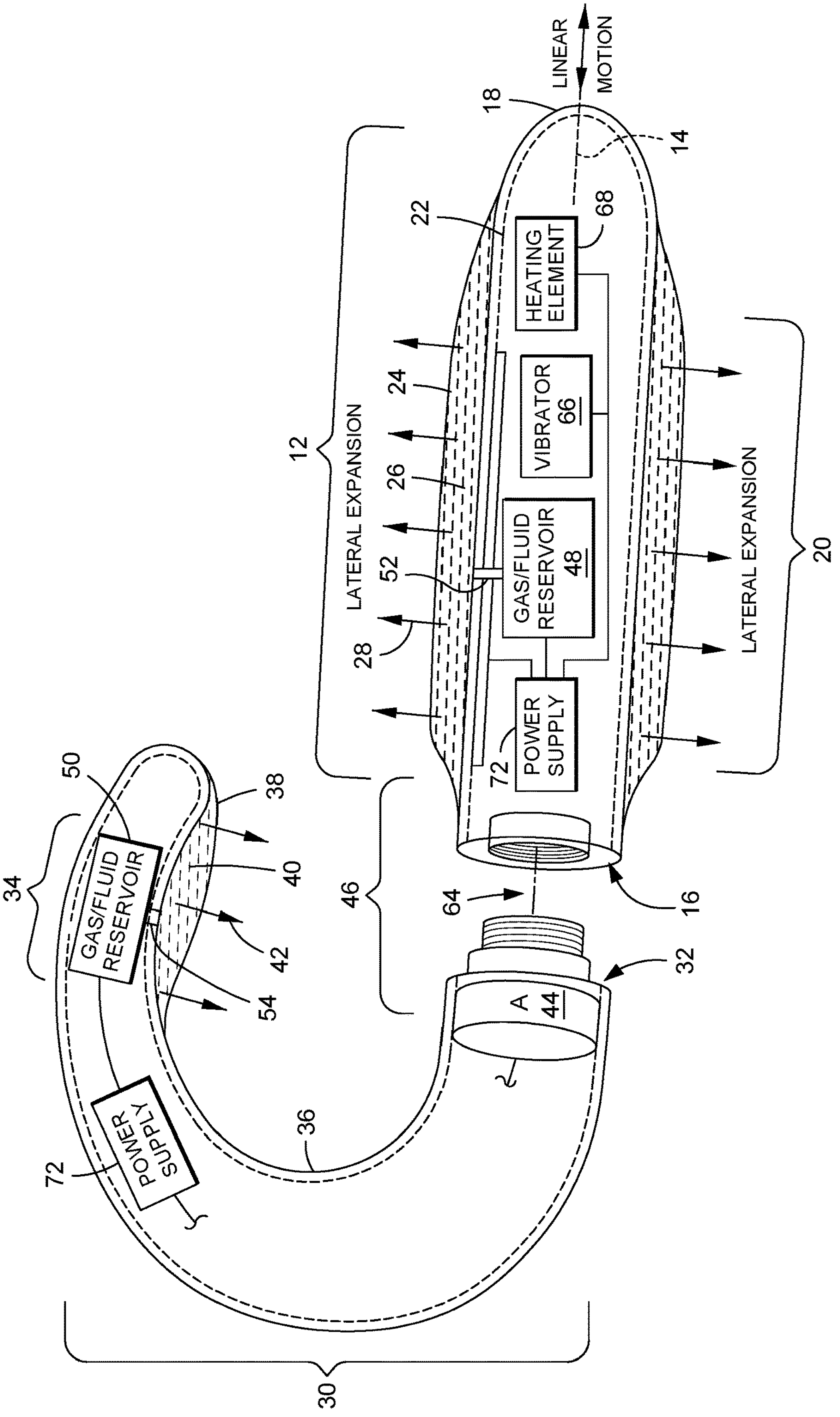
FIG. 3 is a side cutaway view illustrating an enhanced dilatation device according to a third exemplary embodiment of the present disclosure.

Turning now to FIG. 3, a third exemplary embodiment of an enhanced dilatation device 10 is shown in which in which the rear rigid arcuate member 30 detachably connectible to the forward rigid elongate member 12 at the junction interface 46 of the first and second junction regions 16, 32. In addition to the potential benefits of such detachable connectivity, and various schemes for implementing it, all of which are described in substantial detail above, it may be appreciated that there are a number of schemes which may permit enhanced functionality between a rear rigid arcuate member 30 detachably connectible to the forward rigid elongate member 12 which my result in, for example but without limitation, a reduction in the number of discrete parts required for the overall device to function. It is specifically contemplated that one or more transmission elements 64 may be positioned at the junction interface upon the first and second junction regions 16, 32 which may enable the transmission across the junction interface 46 of one or more of: electrical power, electrically propagated signals, mechanical power, mechanically propagated signals, hydraulic power, hydraulically promulgated signals, pneumatic power, pneumatically promulgated signals, inflation fluid, or combinations thereof. For example, it may be seen that by positioning a number of electrical contact relay surfaces which are configured to align when the first and second junction regions 16,32 are connected to one another, electrical signals or electrical power may be transmitted between the rigid arcuate member 30 and the forward rigid elongate member 12. In this fashion, it may be seen that better or more simple control may be achieved of the entire device, even if the two components are purchased separately and attached later by the user, without requiring any difficult procedures or distinct charging of power sources within each individual component, such as via utilizing a single power supply 72 and a single control unit 62 located in one of either the forward rigid elongate member 12 or the rear rigid arcuate member 30, which propagates power and control signals (contemplated to be electrical in the exemplary embodiments, but other types are possible as well) to the other. As such, the devices may not be required to be independently powered or recharged or controlled in use, or may share electrical power or synchronize controls with one another even if they are capable of being independently powered or recharged or controlled in use. Similar schemes are readily contemplatable, including different schemes for achieving such transmission elements, which may even be a simple plug or wire that is attached to each component prior to the attachment of the two components directly to one another. Further, it may be seen that such schemes may also include schemes for linking together the hydraulic or pneumatic circuits of the balloon inflation systems. It may be seen that any number of schemes for using known or future invented systems may be utilized in combination with the presently disclosed embodiments, and that scope and spirit of the disclosure is not meant to be limited to merely those exemplary schemes disclosed herein.

Figure 4:
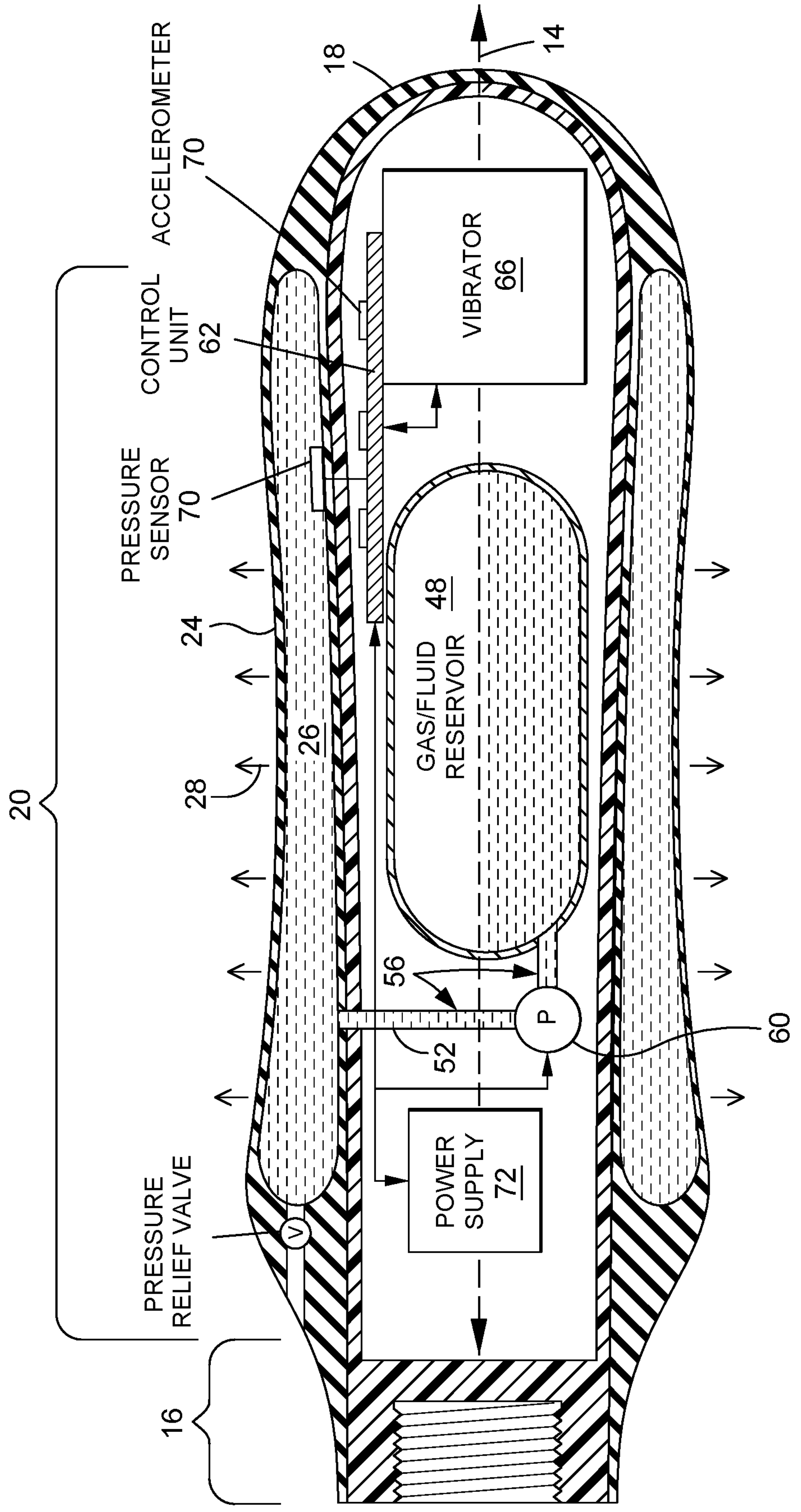
FIG. 4 is a side cross-sectional view illustrating a forward rigid elongate member of an enhanced dilatation device of a type similar to that shown in FIG. 3.

Turning now to FIG. 4, a side cross-sectional view illustrating a forward rigid elongate member 12 of a type similar to that shown in FIG. 3. As may be appreciated, a device of this type may be used manually without a rear rigid arcuate member 30, but may be seen to include an attachment point at the first junction region 16 that may be configured to be attached to a rear rigid arcuate member 30. In this way, it may be seen that even an existing owner of a dilatation device consisting of a forward rigid elongate member 12 may readily upgrade or retrofit their device via the attachment of a subsequently obtained rear rigid arcuate member 30 to produce an enhanced dilatation device 10 capable of most or all of the advantageous features discussed herein.

Further, it may be seen in FIG. 4 that a control unit 62 may be in communication with a sensory element 70 for measuring one or more aspects internal or external to the enhanced dilatation device. Many schemes are known or readily conceivable for controlling the various aspects of a dilatation device which take into consideration measurements received by a sensory element 70, including many which are disclosed in Applicant's earlier filed U.S. patent application Ser. No. 17/655,761, entitled IMPROVED DILATATION DEVICE INCORPORATING INFLATABLE BALLOON, such as accelerometers, the disclosure of which are expressly incorporated by reference as if restated herein. For example, it may be desirable for a control unit 62 to control a pump 60 to cause additional inflation fluid to flow to the second inflation lumen 40 in response to a detection by a pressure sensor the pressure within the second inflation lumen 40 has fallen to a level insufficient to sufficiently anchor the rear rigid arcuate member 30 against an anatomical feature of the user, or to cause inflation fluid to flow in the reverse direction in response to detection that the pressure has increased to exceed a predetermined level of desired pressure. It may be seen that any number of known or future developed schemes for using such sensory elements 70 in combination with the presently disclosed embodiments, and that scope and spirit of the disclosure is not meant to be limited to merely those exemplary schemes disclosed herein.

According to a further embodiment of the contemplated enhanced dilatation device 10 specifically tailored as a therapeutic medical device for treating vaginismus, it is contemplated that the forward rigid elongate member 12 may have a substantially smaller diameter than that of the illustrated embodiments. For example, the rigid elongate member 12 may only have a diameter similar to that of a user's finger or a pencil, but may have a sheath 22 with an inflation lumen 26 configured with walls thicker and more resilient than those of the illustrated embodiments. A vibratory element 66 may or may not be including in order to aid in insertion, as well as a heating element 68 to aid in muscle relaxation, In this regard, it may be desirable for the first reservoir 48 to be housed in a portion of the device that is not inserted in the user (i.e. not in the forward rigid elongate member 12), to aid in improving the form factor for ease of insertion, which may be within the rear rigid arcuate member 30, or another location, such as external to the device via a tether which includes the first conduit 52. It may further be seen that in such a configuration, the inflation functionality may be desired to project the inflation portion 28 more rigidly outward, and that to do so, it may be preferred to utilize a liquid rather than a gas as the inflation fluid, in order to better achieve a hydraulic action more resistant to external compressive forces, as liquids are generally incompressible relative to gases. As may be appreciated, for such a configuration, overall speed of inflation/deflation may not be as important as overall rigidity of the first inflation portion 28 in order to better counteract any spasms of the user, so by tailoring the device to emphasize those specific features which assist in its functionality, different variations of the herein contemplated devices may naturally be conceived of, designed and/or manufactured by one of skill in the art, and that such variations will still be within the scope of the present disclosure.

Figure 5:
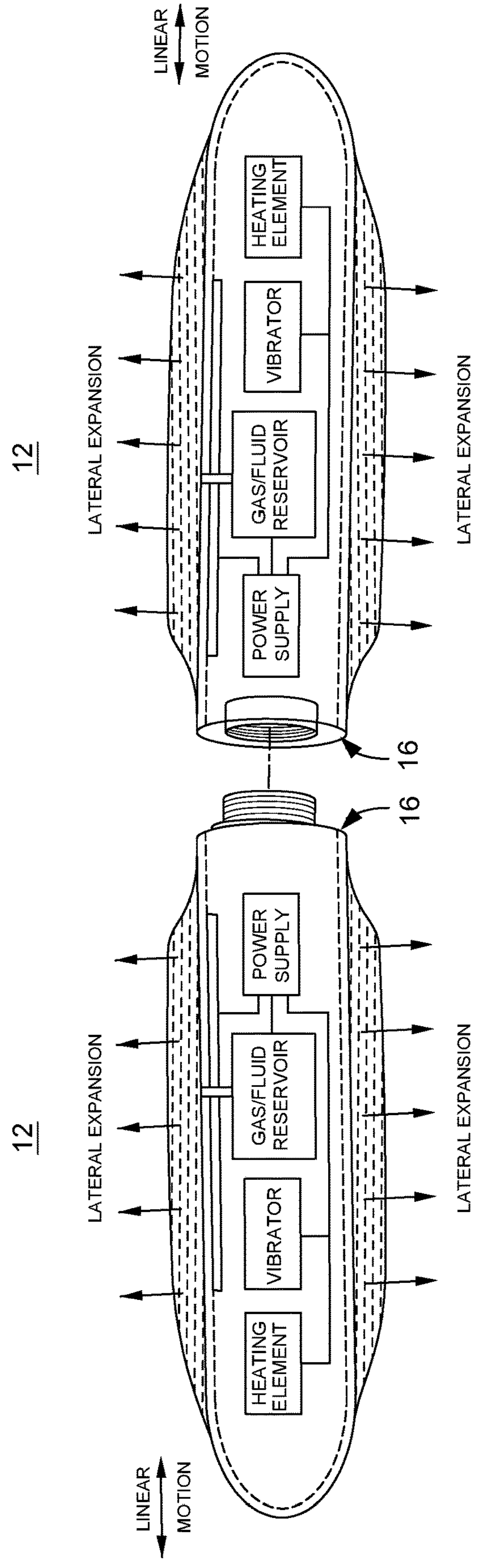
FIG. 5 is a side cutaway view illustrating a configuration of an enhanced dilatation device according to a fourth exemplary embodiment of the present disclosure.

Turning now to FIG. 5, it may also be seen that the enhanced dilatation device 10 may be further configurable to enable the attachment of two forward rigid elongate members 12 in opposed directions at the junction interface 46 of their respective first junction regions 16. In this fashion, it may further be seen that at least one actuator 44 is operative to linearly extend and retract at least the insertion end of at least one of the forward rigid elongate members 12 along the longitudinal axis 14 of that forward rigid elongate member 12 independent of the other forward rigid elongate member 12. The respective first junction regions 16 of the two forward rigid elongate members 12 may further comprises one or more transmission elements for transmitting, between the two forward rigid elongate members across the junction interface, one or more selected from: electrical power, electrically propagated signals, mechanical power, mechanically propagated signals, hydraulic power, hydraulically promulgated signals, pneumatic power, pneumatically promulgated signals, inflation fluid, or combinations thereof. In this fashion, it may be seen that the elements described above may be recombined in a new fashion in order to produce devices which may be adapted to different forms of use, such as simultaneous use by more than one user, or use of two forward rigid elongate members 12 by a single user for simultaneous dilatation of both the vagina and the anus, which may be further advantageously achieved by utilizing a linking structure at the junction interface 46 which may be flexible or which may generally maintain the two forward rigid elongate members 12 at a particular desired angle with respect to one another. It may be seen that any number of known or future developed schemes for connecting together two forward rigid elongate members 12 in combination with the presently disclosed embodiments, and that scope and spirit of the disclosure is not meant to be limited to merely those exemplary schemes disclosed herein.

As may be appreciated, the enhanced dilatation device 10 may also include a power supply 72 for providing power for the pump(s) 60 and the control unit 62 and/or the vibrational, element 66, the heating element 68, the sensory element 70, or other elements which may require electrical or other types of power. Such power supply or supplies 72 may be positioned within one or both of the forward rigid elongate member 12 or the rear rigid arcuate member 30, and depending on the configuration of the device, as described in substantial detail above, one or multiple discrete power supplies may be required. In the exemplary embodiments, the power supply is an internal rechargeable battery which may be connected to an external source of power to recharge, similar to many conventional battery-powered devices. Alternatively, the power supply 72 may comprise one or more replaceable batteries, which again are entirely conventional and known in the art. Perhaps less preferably, the power supply may alternatively be represented by a connection to an external source of power, such as an electrical plug connectable to a residential power outlet. Many other potential forms of motive power are known in the art, and may be utilized as the power supply 72, including but not limited to pneumatic sources of power, such as pneumatic hand pumps (in the case manual control of the pumping elements, for example is desired), or other forms of energy storage other than electrochemically stored energy.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the exemplary embodiments.

What is claimed is:

1. An enhanced dilatation device, the enhanced dilatation device comprising:

a forward rigid elongate member defining a longitudinal axis and having a first junction region, a insertion end, and a shaft region therebetween;

an elongate member sheath secured to and at least partially enclosing at least a portion of an exterior of the shaft region, the sheath having a first outer surface and a first inflation lumen, the first inflation lumen being transitionable between inflated and deflated configurations, wherein transitioning of the first inflation lumen to its inflated configuration is operative to cause a first inflation portion of the first outer surface to expand away from the exterior of the shaft region, and wherein transitioning of the first inflation lumen to its deflated configuration is operative to cause the inflation portion of the first outer surface to retract towards the exterior of the shaft region;

a rear rigid arcuate member having a second junction region, an expansion region, and an arcuate region therebetween;

the expansion region having a second outer surface and a second inflation lumen, the second inflation lumen being transitionable between inflated and deflated configurations, wherein transitioning of the second inflation lumen to its inflated configuration is operative to cause a second inflation portion of the second outer surface to expand away from the exterior of the expansion region, and wherein transitioning of the second inflation lumen to its deflated configuration is operative to cause the second inflation portion of the second outer surface to retract towards the exterior of the expansion region;

an actuator operative to linearly extend and retract at least the insertion end of the forward rigid elongate member along the longitudinal axis independent of the remainder of the enhanced dilatation device;

at least one reservoir operative to contain inflation fluid;

a first conduit and a second conduit, each of the first and second conduits defining a respective first and second inflation fluid pathway between one of the at least one reservoir and a respective one of the first and second inflation lumens;

at least one pump associated with the first and second inflation fluid path ways, each pump being operative to regulate the flow of inflation fluid between at least one of the at least one reservoir and at least one of the first and second inflation lumens, a net flow of inflation fluid from a reservoir into an inflation lumens being associated with the transition of that inflation lumen to its inflated configuration, and a net flow of inflation fluid from an inflation lumen into a reservoir being associated with the transition of the inflation lumen to its deflated configuration; and one or more control units operative to control the operation of the at least one pump and the operation of the actuator; and wherein the rear rigid arcuate member is connected to the forward rigid elongate member at a junction interface of the first and second junction regions.

2. The enhanced dilatation device of claim 1, wherein the at least one reservoir comprises a first and a second reservoir, wherein the first reservoir is enclosed within the forward rigid elongate member with the first conduit defining the first inflation fluid pathway between the first reservoir and the first inflation lumen, and wherein the second reservoir is enclosed within the rear rigid arcuate member with the second conduit defining the second inflation fluid pathway between the second reservoir and the second inflation lumen.

3. The enhanced dilatation device of claim 1, wherein the at least one reservoir comprises a first reservoir enclosed within the forward rigid elongate member, with the first conduit defining the first inflation fluid pathway between the single reservoir and the first inflation lumen, and the second conduit defining the second inflation fluid pathway between the single reservoir and the second inflation lumen.

4. The enhanced dilatation device of claim 1, wherein the actuator is positioned within the forward rigid elongate member, and is configured to linearly extend and retract the insertion end of forward rigid elongate member along the longitudinal axis independent of the remainder of the enhanced dilatation device.

5. The enhanced dilatation device of claim 1, wherein the actuator is positioned within the forward rigid elongate member or within the rear rigid arcuate member, and is configured to linearly extend and retract the forward rigid elongate member along the longitudinal axis independent of the remainder of the enhanced dilatation device.

6. The enhanced dilatation device of claim 1, wherein the control unit is operative to control the actuator and the at least one pump operative to regulate the flow of inflation fluid between the at least one reservoir and the first inflation lumen such that they operate in synchronization with one another.

7. The enhanced dilatation device of claim 6, wherein the control unit is operative to cause the actuator to extend at least the insertion end of the forward rigid elongate member in synchrony with the transition of the first inflation lumen to the inflated configuration, and to cause the actuator to retract at least the insertion end of the forward rigid elongated member in synchrony with the transition of the first inflation lumen to the deflated configuration.

8. The enhanced dilatation device of claim 1, wherein the rear rigid arcuate member is integrally connected to the forward rigid elongate member at the junction interface of the first and second junction regions.

9. The enhanced dilatation device of claim 1, wherein the rear rigid arcuate member is detachably connectible to the forward rigid elongate member at the junction interface of the first and second junction regions.

10. The enhanced dilatation device of claim 9, wherein the junction interface of the first and second junction regions further comprises one or more transmission elements for transmitting, between the forward rigid elongate member and the rear rigid arcuate member across the junction interface, one or more selected from: electrical power, electrically propagated signals, mechanical power, mechanically propagated signals, hydraulic power, hydraulically promulgated signals, pneumatic power, pneumatically promulgated signals, inflation fluid, or combinations thereof.

11. The enhanced dilatation device of claim 9, wherein the enhanced dilatation device is further configurable to enable the attachment of two forward rigid elongate members in opposed directions at the junction interface of their respective first junction regions.

12. The enhanced dilatation device of claim 11, wherein when two forward rigid elongate members are configured to be attached in opposed directions at the junction interface of their respective first junction regions, at least one actuator is operative to linearly extend and retract at least the insertion end of at least one of the forward rigid elongate members along the longitudinal axis of that forward rigid elongate member independent of the other forward rigid elongate member.

13. The enhanced dilatation device of claim 11, wherein the respective first junction regions of the two forward rigid elongate members further comprises one or more transmission elements for transmitting, between the two forward rigid elongate members across the junction interface, one or more selected from: electrical power, electrically propagated signals, mechanical power, mechanically propagated signals, hydraulic power, hydraulically promulgated signals, pneumatic power, pneumatically promulgated signals, inflation fluid, or combinations thereof.

14. The enhanced dilatation device of claim 1, further comprising one or more vibratory elements within the forward rigid elongate member or the rear rigid arcuate member.

15. The enhanced dilatation device of claim 1, further comprising one or more heating elements within the forward rigid elongate member or the rear rigid arcuate member.

16. The enhanced dilatation device of claim 1, further comprising one or more sensory elements within the forward rigid elongate member or the rear rigid arcuate member.

17. An attachment fora dilatation device having at least a first junction region and an insertion end, and defining a longitudinal axis, the attachment comprising:

a rear rigid arcuate member having a second junction region operative to connect to the first junction region, an expansion region, and an arcuate region therebetween;

the expansion region having an outer surface and an inflation lumen, the inflation lumen being transitionable between inflated and deflated configurations, wherein transitioning of the inflation lumen to its inflated configuration is operative to cause an inflation portion of the outer surface to expand away from the exterior of the expansion region, and wherein transitioning of the inflation lumen to its deflated configuration is operative to cause the inflation portion of the outer surface to retract towards the exterior of the expansion region;

a reservoir operative to contain inflation fluid;

a conduit defining an inflation fluid pathway between the reservoir and the inflation lumen;

a pump associated with the inflation fluid pathway, the pump being operative to regulate the flow of inflation fluid between the reservoir and the inflation lumen, a net flow of inflation fluid from the reservoir into the inflation lumen being associated with the transition of the inflation lumen to its inflated configuration, and a net flow of inflation fluid from the inflation lumen into the reservoir being associated with the transition of the inflation lumen to its deflated configuration; and one or more control units operative to control the operation of the pump.

18. The attachment of claim 11, further comprising an actuator within the rear rigid arcuate member operative to linearly extend and retract at least the insertion end of the dilatation device independent of the rear rigid arcuate member along the longitudinal axis.

19. The attachment of claim 12, wherein the control unit is further operative to control the operation of the actuator.

20. The attachment of claim 11, wherein the second junction region comprises one or more transmission elements for transmitting, between the dilatation device and the rear rigid arcuate member across the junction interface, one or more selected from: electrical power, electrically propagated signals, mechanical power, mechanically propagated signals, hydraulic power, hydraulically promulgated signals, pneumatic power, pneumatically promulgated signals, inflation fluid, or combinations thereof.

* * * * *